(12) United States Patent
Edwards

(10) Patent No.: US 9,321,538 B2
(45) Date of Patent: Apr. 26, 2016

(54) SUPERCONDUCTING ELECTRICAL SYSTEM

(71) Applicant: ROLLS-ROYCE PLC, London (GB)

(72) Inventor: Huw Llewelyn Edwards, Derby (GB)

(73) Assignee: ROLLS-ROYCE plc, London (GB)

( * ) Notice: Subject to any disclaimer, the term of this patent is extended or adjusted under 35 U.S.C. 154(b) by 812 days.

(21) Appl. No.: 13/625,490

(22) Filed: Sep. 24, 2012

(65) Prior Publication Data

US 2013/0082518 A1    Apr. 4, 2013

(30) Foreign Application Priority Data

Sep. 29, 2011    (GB) .................................. 1116759.0

(51) Int. Cl.

| | |
|---|---|
| *B60L 1/00* | (2006.01) |
| *B60L 3/00* | (2006.01) |
| *H02G 3/00* | (2006.01) |
| *B64D 33/08* | (2006.01) |
| *E02D 27/42* | (2006.01) |
| *B64D 13/06* | (2006.01) |

(52) U.S. Cl.
CPC .............. *B64D 33/08* (2013.01); *E02D 27/425* (2013.01); *B64D 2013/0614* (2013.01); *Y02E 40/622* (2013.01)

(58) Field of Classification Search
CPC ...... B64D 33/08; Y02E 40/622; B60L 220/10
USPC ......................................................... 307/9.1
See application file for complete search history.

(56) References Cited

U.S. PATENT DOCUMENTS

| | | | |
|---|---|---|---|
| 3,646,243 A | 2/1972 | Graneau et al. | |
| 7,883,053 B2* | 2/2011 | Zielinski | ............... B64D 13/00 165/140 |
| 2006/0254255 A1* | 11/2006 | Okai | ..................... B64D 27/24 60/226.1 |
| 2008/0191561 A1 | 8/2008 | Folts et al. | |
| 2011/0177954 A1* | 7/2011 | Gamble | ................... H02J 3/36 505/163 |

FOREIGN PATENT DOCUMENTS

| | | |
|---|---|---|
| EP | 0 957 026 A2 | 11/1999 |
| EP | 1 914 162 A1 | 4/2008 |

OTHER PUBLICATIONS

Search Report issued in European Patent Application No. 12185593 dated Jan. 4, 2013.
Jan. 27, 2012 Search Report issued in British Patent Application No. GB1116759.0.

* cited by examiner

*Primary Examiner* — Carlos Amaya
(74) *Attorney, Agent, or Firm* — Oliff PLC

(57) ABSTRACT

This invention relates to a superconducting electrical network, comprising: an electrical system including a plurality of superconducting electrical equipment; a cryogenic system including one or more refrigeration units for providing coolant to the plurality of superconducting electrical equipment; a controller configured to control the flow of coolant to the plurality of superconducting electrical equipment, wherein the controller is configured to isolate the supply of refrigerant to one or more of the plurality of electrical equipment upon demand and increase the flow of coolant to one or more of the non-isolated plurality of electrical equipment.

13 Claims, 1 Drawing Sheet

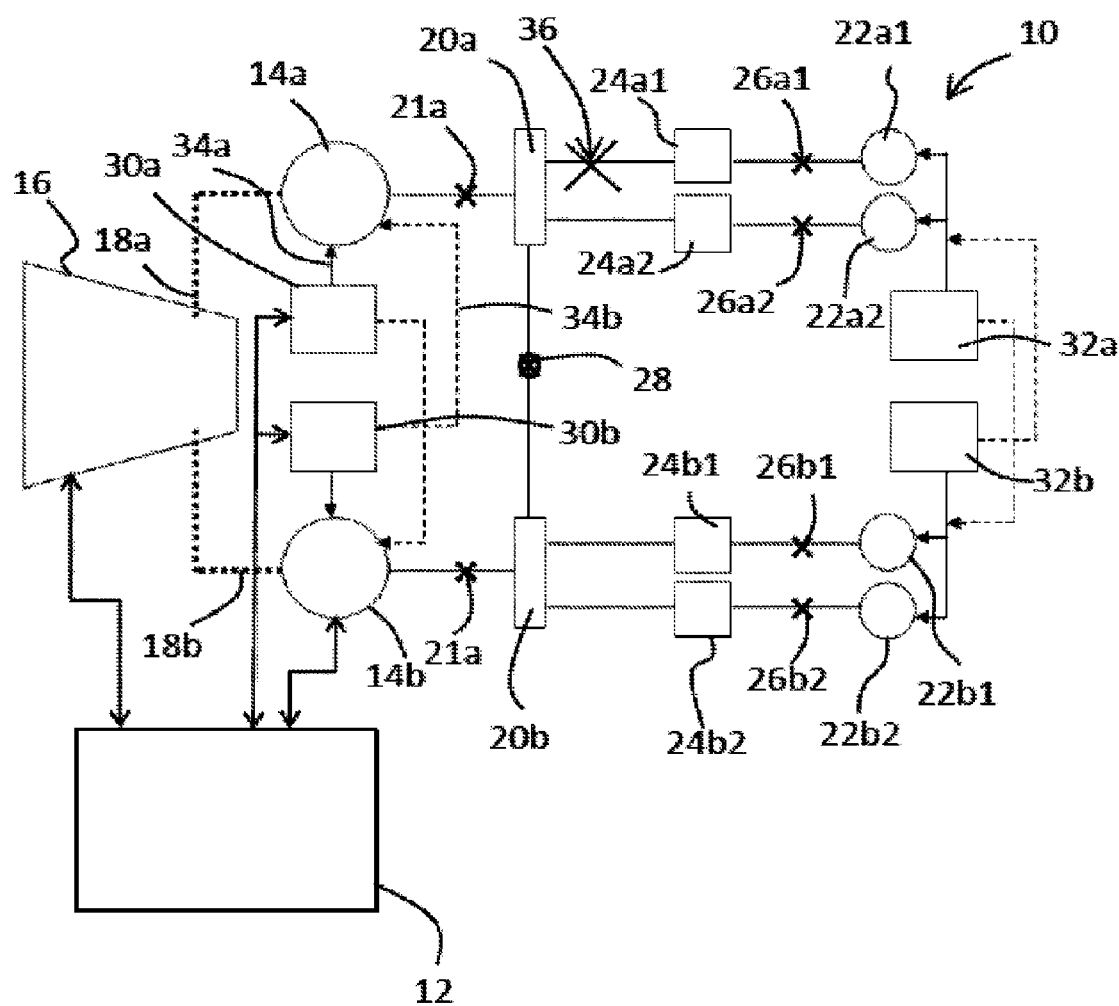

SUPERCONDUCTING ELECTRICAL SYSTEM

TECHNICAL FIELD OF INVENTION

This invention relates to a superconducting electrical system and its method of operation. In particular, though not exclusively, this invention relates to superconducting electrical system for an aircraft.

BACKGROUND OF INVENTION

Conventional state of the art propulsion systems for large civil aircraft typically include one or more gas turbine engines placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with the current state of the art technology.

One option for a distributed propulsion system is to have numerous electrically powered fan units located around the aircraft. However, early studies by the applicant have indicated that novel electrical technology will be required to implement such a distributed electrical system.

One such technology is the creation of a superconducting system to provide the electrical power to the fan units so as to try and reduce the weight of the electrical system.

The concept of using a superconductor for providing electrical power is well known. A superconductor conducts electricity without loss, that is, with zero electrical resistance. In order to be superconducting, current state of the art superconductor materials must be maintained below a critical temperature, current density and magnetic field. If any of the critical limits are exceeded then the superconductor is said to "quench", at which point it reverts to its "normal" electrical (and magnetic) properties.

One problem presented by the use of superconducting technology in an aircraft arises from weight and the fact that there will likely be a requirement for some redundancy in any system to accommodate a fault.

The present invention seeks to provide a way to help reduce the overall weight of a superconducting electrical system whilst providing some redundancy in the system.

STATEMENTS OF INVENTION

In a first aspect, the present invention provides a superconducting electrical network, comprising: an electrical system including a plurality of superconducting electrical equipment; a cryogenic system including one or more refrigeration units for providing coolant to the plurality of superconducting electrical equipment; a controller configured to control the flow of coolant to the plurality of superconducting electrical equipment, wherein the controller is configured to isolate the supply of refrigerant to one or more of the plurality of electrical equipment upon demand and increase the flow of coolant to one or more of the non-isolated plurality of electrical equipment.

Providing an increased flow of coolant to electrical equipment allows it to be driven at a higher level of demand. Hence, if an item of electrical equipment fails, its loss can be compensated for by increasing the flow of coolant to the other items of electrical equipment and driving that equipment harder.

The superconducting electrical equipment any combination taken from the non-exclusive group including: generators, motors, cabling, power electronic units and fault current limiters.

The electrical network can be part of an isolated network having a low electrical inertia. The isolated network may have less than ten electrical generators. The electrical network may be that of an aircraft or vessel. The electrical network may be suitable for distributing electrical power to a plurality of electrical propulsion units.

The superconducting system may include a plurality of refrigeration units, two or more of which may be joined to a coolant network which provides coolant to two or more items of electrical equipment.

The electrical network may further comprise a superconducting electrical generator and a prime mover which provides input power to the electrical generator, wherein the controller may be configured to control the input of power from the prime mover.

The controller may be configured to increase the power output of one or more items of electrical equipment when the flow of coolant is increased to that item of electrical equipment. Increasing the power output includes one or more of increasing the current flow in the equipment, increasing the electrical frequency supplied to the equipment, and increasing the switching frequency.

The electrical equipment may include a plurality of motors and increasing the power output of the electrical equipment includes increasing the rotational speed of one or more of the motors.

The controller may be configured to increase the rotational speed of the prime mover to increase the electrical frequency supplied to an item of electrical equipment.

The superconducting electrical equipment may include one or more of generators, motors, refrigeration unit and power electronic conditioning units.

The controller may be configured to increase the power output from one or more refrigeration units.

In a second aspect, the present invention may provide a method of controlling power distribution within a superconducting electrical network having an electrical system including a plurality of superconducting electrical equipment; a cryogenic system including one or more refrigeration units for providing coolant to the plurality of superconducting electrical equipment; and, a controller, the method comprising: monitoring the electrical equipment to determine whether its operating condition falls within predetermined limits; electrically isolating an item of electrical equipment if it falls outside of the predetermined limits; diverting the flow of coolant from the isolated item of electrical equipment to at least one non-isolated item of electrical equipment.

The operating condition of electrical equipment may include monitoring the terminal voltage of the equipment, monitoring the instantaneous or average reactive or real power flow within the electrical equipment. The electrical equipment may include any from the non-exclusive group comprising generators, motors, isolators and superconducting fault current limiters.

The method may include increasing the power output from one or more items of the electrical equipment when the flow of coolant is increased to that item of electrical equipment. The method may also comprise increasing the power output of one or more electrical generators in the electrical system by increasing the input power received from a prime mover.

Increasing the power output may include one or more of increasing the current flow in the equipment, increasing the electrical frequency supplied to the equipment, and increasing the switching frequency.

The electrical equipment may include a plurality of motors. Increasing the power output of the electrical equipment may include increasing the rotational speed of one or more of the motors.

The method may further comprise increasing the rotational speed of the prime mover to increase the electrical frequency supplied to an item of electrical equipment.

The method may further comprise the step of monitoring the electrical network to determine the operating condition of the cryogenic system.

Monitoring the cryogenic system may include monitoring the temperature of the electrical equipment or the operating condition of an individual refrigeration unit,

DESCRIPTION OF DRAWING

Embodiments of the invention are described below with the aid of the following drawing in which:

FIG. 1 shows an electrical network according to the present invention.

DETAILED DESCRIPTION OF INVENTION

FIG. 1 shows a superconductive electrical network 10 which includes an electrical system and a cryogenic system, the operation of which are monitored by a controller 12.

The electrical network 10 described in this embodiment is part of an aircraft which utilises so-called distributed propulsion in which a plurality of electrically driven propulsive units are distributed about the airframe. However, the invention is not limited to this application and can be implemented on any superconducting electrical network.

The electrical system includes a plurality of pieces of superconducting electrical equipment. The superconducting electrical equipment includes superconducting generators, superconducting motors, refrigeration units, power electronic units in the form of convertors which are used to control the frequency and voltage within the network, and various electrical buses and wiring looms which include superconducting cables for example.

It will be appreciated that the term superconducting electrical equipment may embrace other items of equipment. Further, some of the equipment within the electrical system may not be superconducting. For example, the various electrical buses and wiring looms may or may not be superconducting. As will also be appreciated, the electrical system may include any number of ancillary equipment such as isolators and superconducting fault current limiters (not shown).

There are two superconducting electrical generators 14a, 14b which receive input power from a common prime mover in the form of a gas turbine engine 16. The gas turbine engine 16 provides power to the electrical generators 14a, 14b via independent mechanical power off takes 18a, 18b which in practice may include a combination of gearboxes and shafts, although these are not shown here for the sake of clarity.

Each generator feeds a bus bar 20a, 20b via an isolator 21a, 21b, which in turn is connected to various pieces of electrical equipment in the form of two superconducting motors 22a1, 22a2, 22b1, 22b2. The connection between the bus bars 20a, 20b and the motors 22a1, 22a2, 22b1, 22b2 is made via a power electronic convertor 24a1, 24a2, 24b1, 24b2 and electrical isolators 26a1, 26a2, 26b1, 26b2 which are all connected by electrical cables. The bus bars 20a, 20b, and thus electrical generators 14a, 14b, are connected via an isolatable link 28 which extends between the two buses 20a, 20b.

The cryogenic system includes a plurality of refrigeration units 30a, 30b, 32a, 32b which maintain control the supply of a coolant to the various items of superconducting electrical equipment.

There are four refrigeration units 30a, 30b, 32a, 32b in the embodiment shown in FIG. 1. Each generator 14a, 14b has a single dedicated refrigeration unit 30a, 30b and the electrical motors 22a1, 22a2, 22b1, 22b2 each share a refrigeration unit 32a, 32b with one other motor 22a1, 22a2, 22b1, 22b2. Of course, it will be appreciated that the number and distribution of the refrigeration units will be determined by the type and distribution of the electrical equipment, which is in turn determined by the application of the electrical network.

Each refrigeration unit 30a, 30b, 32a, 32b is connected to its respective piece or pieces of electrical equipment via a coolant pathway in the form of a primary conduit. In addition to the primary conduits, there are a secondary conduits which connect at least one other refrigeration unit 30a, 30b, 32a, 32b to each piece of electrical equipment. For example, electrical generator 14a is connected to refrigeration unit 30a via primary conduit 34a, and secondary conduit 34b. In this way, there is a network of coolant conduits 34a, 34b which can be configured to provide each piece of cooling equipment with an alternative supply of coolant.

The superconductor material used for each element can be any known to date which is suitable for the purpose described above. The coolant can be any which is suitable for use with the chosen superconductor. Typical superconductors which would find utilisation would be Bismuth Strontium Calcium Copper Oxide (BSCCO), Yttrium Barium Copper Oxide (YBCO) or Magnesium Diboride ($MgB_2$) which would be cooled by liquid helium or hydrogen, or, in the case of BSCCO and YBCO, liquid nitrogen.

The controller 12 is connected to each piece of electrical equipment and the gas turbine engine 16 (although only a few of these connections are shown in FIG. 1 for the sake of clarity) and is configured to monitor the operating condition of each of the pieces of equipment such that it can determine the overall condition of the network 10. The condition may be in terms of the required and delivered distributed propulsive output and the power input. Alternatively, the condition may relate to the operating condition or health of each piece of equipment individually. As will be appreciated, the monitoring of the operating condition will involve the use of detection equipment, for example sensors, within the equipment or at selected locations throughout the electrical network. These sensors may include voltage, current or power meters, speed sensors or temperature sensors.

In an alternative embodiment, the controller 12 may also be connected to the cryogenic system and monitor its operating condition so as to determine whether the coolant is being delivered as required for maintaining a superconducting state in each of the pieces of electrical equipment. In this way, if one of the refrigeration units begins to malfunction, it can be isolated and the supply provided from an alternative refrigeration unit, or the piece of electrical equipment which receives the affected coolant flow, isolated.

In operation, the controller 12 monitors the condition of the electrical network and determines whether it is within predetermined limits which represent satisfactory operation. If a piece of equipment develops a fault and operates outside of the acceptable predetermined limits, it may be necessary for it to be isolated and another piece of electrical equipment to be operated at a higher level in order to make up for the shortfall created by the fault. By operating at a higher level, it is meant that the electrical equipment may be operated at a higher power output and subjected to higher current flows, higher frequencies or higher switching frequencies, as appropriate for a given piece of equipment. For example, in the case of a failed motor, other associated motors could be driven at higher speeds by increasing the electrical frequency supplied by power electronics, or by increasing the frequency supplied by the generator by increasing the rotational speed of the prime mover.

As will be appreciated, the fault can be within a piece of electrical equipment or within the electrical distribution network which means that power can no longer be supplied with that required by the system. Hence, for example, if a fault developed in the line at point 36 then it may be necessary to isolate that section of line, thereby making the electrical motor redundant even though it may not have a fault.

Alternatively, it may be that a fault occurs in one of the refrigeration units and so affects the ability of a piece of electrical equipment to operate which results in it being shut down.

To operate the remaining non-isolated electrical equipment at a higher level, the flow of coolant can be diverted from the isolated equipment to the remaining non-isolated equipment which can then be driven using higher current densities than the normal rated values and at which it would not normally be efficient to run at.

In the case of a failure with an electrical generator 14a, 14b, it may also be necessary to increase the torque delivered to the generator 14a, 14b from the gas turbine engine 12. In some circumstances, this may achievable simply by electrically isolating the faulty generator 14a, 14b and allowing it to spin freely thereby removing its mechanical load from the gas turbine engine. In this instance, the extra to torque, or a portion of it at least, would be taken up by the remaining electrical generator which experiences an increased electrical load. In addition there would be a reconfiguration of the electrical loads applied to the generator. Nevertheless, it may be necessary to alter the output of the gas turbine to account for the changes in the electrical system. This may include altering the fuel supply or other variable to increase the speed or torque produced by the gas turbine as is well known in the art.

The above described embodiments are mere examples of the invention defined by the scope of the claims and as such should not be taken to be limiting.

The invention claimed is:

1. An aircraft having a superconducting electrical network, comprising:
    an electrical system including a plurality of superconducting electrical equipment;
    at least one electrical generator for supplying current to the plurality of superconducting electrical equipment;
    a cryogenic system including one or more refrigeration units for providing coolant to the plurality of superconducting electrical equipment;
    a controller configured to control delivery of the current and delivery of the coolant to each of the plurality of the superconducting electrical equipment independently of others,
    the controller configured to monitor the operating condition of each of the plurality of superconducting electrical equipment and on detection of a fault within one of the plurality of superconducting electrical equipment isolate the supply of coolant to that faulted superconducting electrical equipment and increase the flow of coolant to one or more of the remaining non-isolated plurality of superconducting electrical equipment and drive one or more of the remaining non-isolated plurality of superconducting electrical equipment harder whereby to increase the power output thereof and compensate for the isolated superconducting electrical equipment.

2. An aircraft as claimed in claim 1 wherein the cryogenic system includes a plurality of refrigeration units, two or more of which are joined to a coolant network which provides coolant to two or more items of electrical equipment.

3. An aircraft as claimed in claim 1 further comprising a prime mover which provides an input power to the electrical generator(s), wherein the controller is configured to control the input of power from the prime mover.

4. An aircraft as claimed in claim 3, wherein the controller is configured to increase a rotational speed of the prime mover to increase an electrical frequency supplied to an item of electrical equipment.

5. An aircraft as claimed in claim 1, wherein increasing the power output includes one or more of increasing a current flow in the equipment, increasing an electrical frequency supplied to the equipment, and increasing a switching frequency of the electrical supply.

6. An aircraft as claimed in claim 1, wherein the electrical equipment includes a plurality of motors and increasing the power output of the electrical equipment includes increasing a rotational speed of one or more of the motors.

7. An aircraft as claimed in claim 1, wherein the superconducting electrical equipment includes one or more of generators, motors, refrigeration unit and power electronic conditioning units.

8. An aircraft as claimed in claim 1, wherein the controller is configured to increase a power output from one or more refrigeration units.

9. A method of controlling power distribution within an aircraft having a superconducting electrical network comprising
    an electrical system including a plurality of superconducting electrical equipment;
    at least one electrical generator for supplying current to the plurality of superconducting electrical equipment;
    a cryogenic system including one or more refrigeration units for providing coolant to the plurality of superconducting electrical equipment; and
    a controller configured to control delivery of the current and delivery of the coolant to each of the plurality of the superconducting electrical equipment independently of others,
    the method performed by the controlling and comprising:
        monitoring the operating condition of each of the plurality of superconducting electrical equipment to determine whether one or more of the plurality of superconducting electrical equipment's operating condition falls within predetermined limits;
        electrically isolating an item of the plurality of superconducting electrical equipment if the monitored conditions fall outside of the predetermined limits;
        diverting the flow of coolant from the isolated item of superconductive electrical equipment and increasing flow of coolant to at least one non-isolated item of superconductive electrical equipment, and
        increasing a power output from the least one of the non-isolated superconductive electrical equipment to which the flow of coolant is increased whereby to compensate for the isolated superconducting electrical equipment.

10. A method as claimed in claim 9, wherein the step of increasing the power output involves increasing the power output to the at least one electrical generator by increasing an input power received from a prime mover.

11. A method as claimed in claim 9, wherein the step of increasing the power output includes one or more of increasing a current flow in the equipment, increasing an electrical frequency supplied to the equipment, and increasing a switching frequency of the electrical supply.

12. A method as claimed in claim 11, further comprising increasing a rotational speed of the prime mover to increase the electrical frequency supplied to an item of electrical equipment.

13. A method as claimed in claim 9, wherein the superconductive electrical equipment includes a plurality of motors and increasing the power output of the superconductive electrical equipment includes increasing a rotational speed of one or more of the motors.

\* \* \* \* \*